(12) United States Patent
Cherry et al.

(10) Patent No.: US 9,480,040 B2
(45) Date of Patent: Oct. 25, 2016

(54) MITIGATING RECEIVE-TRANSMIT CONFLICTS IN MULTIPLE SIM CARD COMMUNICATIONS

(71) Applicant: QUALCOMM Incorporated, San Diego, CA (US)

(72) Inventors: Marc Robert Cherry, Maidenhead (GB); Neha Goel, Surrey (GB); Divaydeep Sikri, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 14/323,282

(22) Filed: Jul. 3, 2014

(65) Prior Publication Data

US 2016/0007312 A1    Jan. 7, 2016

(51) Int. Cl.
| | |
|---|---|
| *H04W 4/00* | (2009.01) |
| *H04W 60/00* | (2009.01) |
| *H04W 8/18* | (2009.01) |
| *H04W 88/06* | (2009.01) |
| *H04W 48/16* | (2009.01) |
| *H04W 72/12* | (2009.01) |

(52) U.S. Cl.
CPC ........... *H04W 60/005* (2013.01); *H04W 8/183* (2013.01); *H04W 48/16* (2013.01); *H04W 72/1215* (2013.01); *H04W 88/06* (2013.01)

(58) Field of Classification Search
CPC .. H04W 60/005; H04W 8/183; H04W 88/06
USPC ................. 455/63.1, 63.2, 63.3, 63.4, 114.2, 455/114.3, 278.1, 279.1
See application file for complete search history.

(56) References Cited

U.S. PATENT DOCUMENTS

| | | | | |
|---|---|---|---|---|
| 7,146,133 B2 * | 12/2006 | Bahl | .............. | H04W 16/14 340/407.1 |
| 8,447,235 B2 * | 5/2013 | Gao | .............. | H04W 72/02 455/41.2 |
| 2003/0181216 A1 * | 9/2003 | Tsai | .............. | H04W 88/06 455/517 |
| 2007/0066359 A1 * | 3/2007 | Zhuang | .............. | H04W 76/023 455/557 |
| 2009/0156257 A1 * | 6/2009 | Shi | .............. | H04W 48/12 455/558 |
| 2012/0231802 A1 * | 9/2012 | Ngai | .............. | H04W 72/1215 455/450 |
| 2013/0012135 A1 * | 1/2013 | Ruohonen | .............. | H04B 1/406 455/63.1 |
| 2013/0203461 A1 * | 8/2013 | Li | .............. | H04W 88/06 455/552.1 |
| 2013/0303240 A1 * | 11/2013 | Sanka | .............. | H04B 1/3816 455/558 |
| 2014/0073312 A1 * | 3/2014 | Su | .............. | H04B 1/0067 455/419 |

FOREIGN PATENT DOCUMENTS

WO    WO-2013124710 A1    8/2013

OTHER PUBLICATIONS

International Search Report and Written Opinion—PCT/US2015/037474—ISA/EPO—Sep. 29, 2015.

* cited by examiner

*Primary Examiner* — Shahriar Behnamian
(74) *Attorney, Agent, or Firm* — Loza & Loza LLP

(57) ABSTRACT

A dual SIM dual active (DSDA) mobile station can perform a service acquisition procedure for a first subscription, while simultaneously performing a registration procedure for a second subscription. In one aspect of the disclosure, the RX (receive) of the victim during acquisition is delayed and yields to the TX (transmit) of the aggressor that is performing registration. In accordance with another aspect of the disclosure, decode failures on good cells due to RX blanking on the victim subscription during acquisition can be reduced or avoided.

24 Claims, 11 Drawing Sheets

Access Network

Location Registration

GSM Multiframe

MITIGATING RECEIVE-TRANSMIT CONFLICTS IN MULTIPLE SIM CARD COMMUNICATIONS

TECHNICAL FIELD

The technology discussed below relates generally to wireless communication devices, and more particularly, to mitigating receive-transmit conflicts in multiple SIM card communication applications.

BACKGROUND

Wireless communication networks are widely deployed to provide various communication services such as telephony, video, data, messaging, broadcasts, and so on. Some networks, which are usually multiple access networks, support communications for multiple users by sharing the available network resources.

One example of such a network is a Global System for Mobile communications (GSM) network, which utilizes a GSM air interface. GSM systems and services are described in a set of 3rd Generation Partnership Project (3GPP) standards. General Packet Radio Service (GPRS) is a packet oriented mobile data service that allows GSM operators to launch wireless data services, such as e-mail and Internet access. Both GSM and GPRS are described in 3GPP standards.

Generally in GSM networks, mobile communication devices are configured to use a subscriber identity module (SIM) or universal subscriber identity module (USIM) to store the subscriber's identity and other information for security and authentication purposes. Some mobile communication devices have multi-SIM capability. In multi-SIM applications, mobile communication devices can have more than one SIM/USIM, such that users can engage in calls (e.g, voice or data) on two or more different subscriptions. These subscriptions might be on the same network or on different networks.

Some multi-SIM mobile equipment may utilize multiple transceivers, such that the mobile equipment may transmit and/or receive on multiple subscriptions simultaneously. When the mobile equipment is simultaneously transmitting and/or receiving signals on multiple subscriptions, this operating condition is referred to as a co-existence condition or conflict.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects of the disclosure, if a co-existence conflict exists between a first subscription and a second subscription, a multi-SIM mobile station (MS) prioritizes the signaling or registration procedure on one subscription relative to service acquisition on the other subscription. In one example, the subscriptions may be a GPRS subscription and a GSM subscription. In one aspect of the disclosure, if there is a co-existence conflict between GSM service acquisition and GPRS registration, the MS prioritizes the GPRS signaling or registration procedure, and delays or lower the priority of the GSM service acquisition. In some aspects of the disclosure, the MS may perform reacquisition on the de-sensed carrier to avoid a full power scan on the GSM subscription.

In one aspect, the disclosure provides a method of operating a mobile station (MS). According to the method, the MS performs a registration procedure for a first subscription. The MS further performs a service acquisition procedure for a second subscription. In addition, if a co-existence conflict between the registration procedure and the service acquisition procedure occurs, the MS prioritizes the registration procedure relative to the service acquisition procedure.

Another aspect of the disclosure provides an apparatus for wireless communication. The apparatus includes means for performing a registration procedure for a first subscription. The apparatus also includes means for performing a service acquisition procedure for a second subscription. In addition, the apparatus includes means for if a co-existence conflict between the registration procedure and the service acquisition procedure occurs, prioritizing the registration procedure relative to the service acquisition procedure.

Another aspect of the disclosure provides a computer-readable storage medium that includes code for causing a mobile station (MS) to perform various functions. The code causes the MS to perform a registration procedure for a first subscription. The code also causes the MS to perform a service acquisition procedure for a second subscription. In addition, if a co-existence conflict between the registration procedure and the service acquisition procedure occurs, the code causes the MS to prioritize the registration procedure relative to the service acquisition procedure.

Another aspect of the disclosure provides an apparatus for wireless communication. The apparatus includes at least one processor, a transmitter and a receiver coupled to the at least one processor, and a memory coupled to the at least one processor. The apparatus further includes a registration component, an acquisition component, and a co-existence component. The registration component is configured to perform a registration procedure for a first subscription. The acquisition component is configured to perform a service acquisition procedure for a second subscription. The co-existence component is configured to if a co-existence conflict between the registration procedure and the service acquisition procedure occurs, prioritize the registration procedure relative to the service acquisition procedure.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

There are certain limitations on carrying communications simultaneously on multiple subscriptions. For example, when the mobile equipment is transmitting signals (i.e., an aggressor) on one subscription and simultaneously receiving signals (i.e., a victim) on another subscription, the aggressor may undesirably affect (e.g., de-sense) the victim. In certain conditions, the victim might not be able to successfully receive the signals.

One or more aspects of the disclosure provide for a mobile station (MS) 100 that is can communicate on two or more subscriptions, for example, a first subscription 102 and a second subscription 104. Each subscription may be using the same or different radio access technologies (RAT). In one aspect of the disclosure, the first subscription may be a GSM subscription, and the second subscription may be a GPRS subscription. The MS 100 may have multiple SIMs/USIMs or SIM applications operating on one or more SIMs/USIMs. Specific examples are provided below with reference to a GSM/EDGE Radio Access Network (GERAN) system that can provide GSM and GPRS services. EDGE refers to Enhanced GPRS or Enhanced Data rates for GSM Evolution. The standards for GERAN are maintained by the 3GPP. The concepts disclosed herein can be applied to any time-division-based system, such as but not limited to a UMTS system using a time-division duplex (TDD) air interface, or an Evolved Universal Terrestrial Radio Access (e-UTRA) system using a Time-Division Long Term Evolution (TD-LTE) air interface. Especially in the multi-SIM (e.g., dual-SIM) examples, the subscriptions might be on any of these types of systems. In one example, the MS 100 may be a dual SIM dual active (DSDA) device that can support simultaneous active communications on two subscriptions 102 and 104. For example, the DSDA device 100 may be transmitting/receiving data (e.g., performing registration for services) on one subscription and simultaneously transmitting/receiving data (e.g., performing cell acquisition) on the other subscription.

Figure 1:
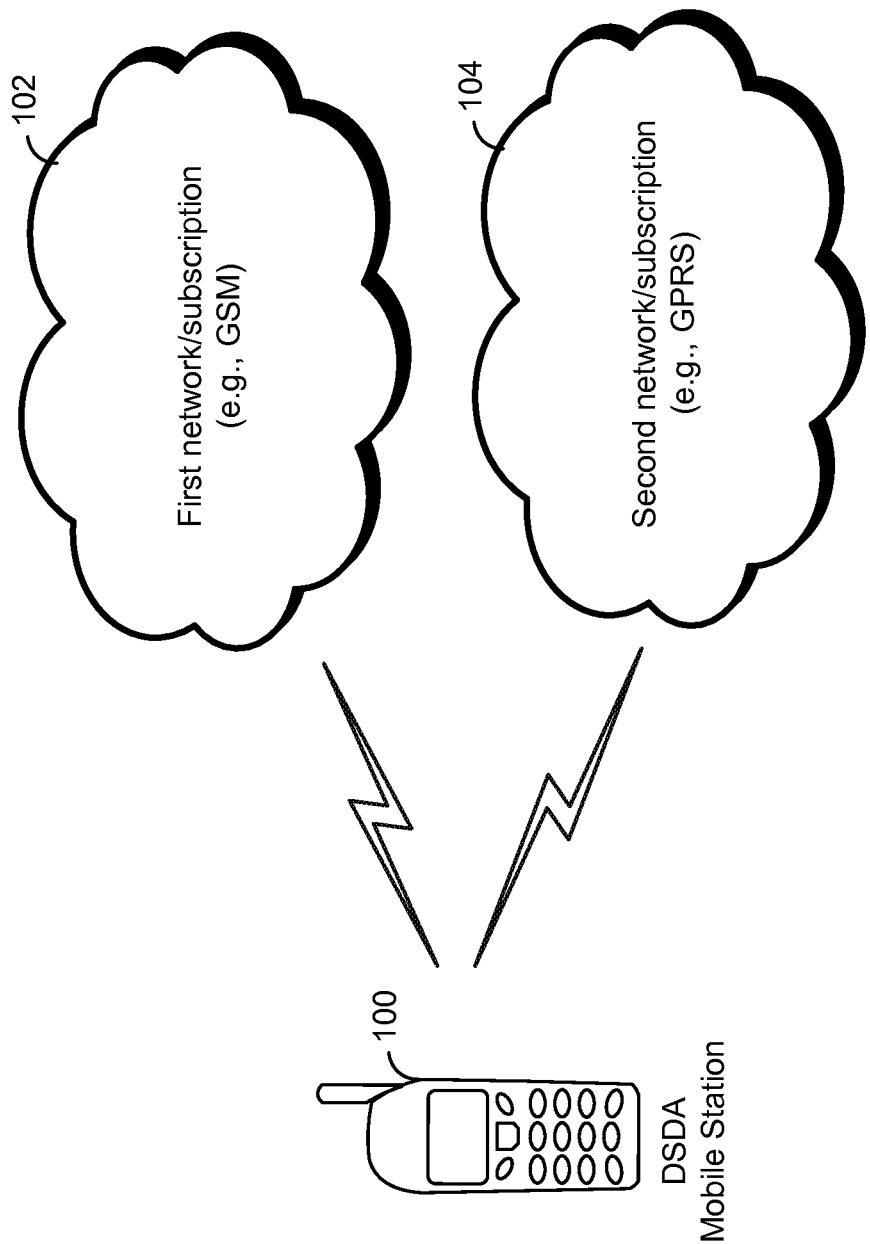
FIG. 1 is a block diagram illustrating an example of a hardware implementation for an apparatus employing a processing system according to some embodiments.
Figure 2:
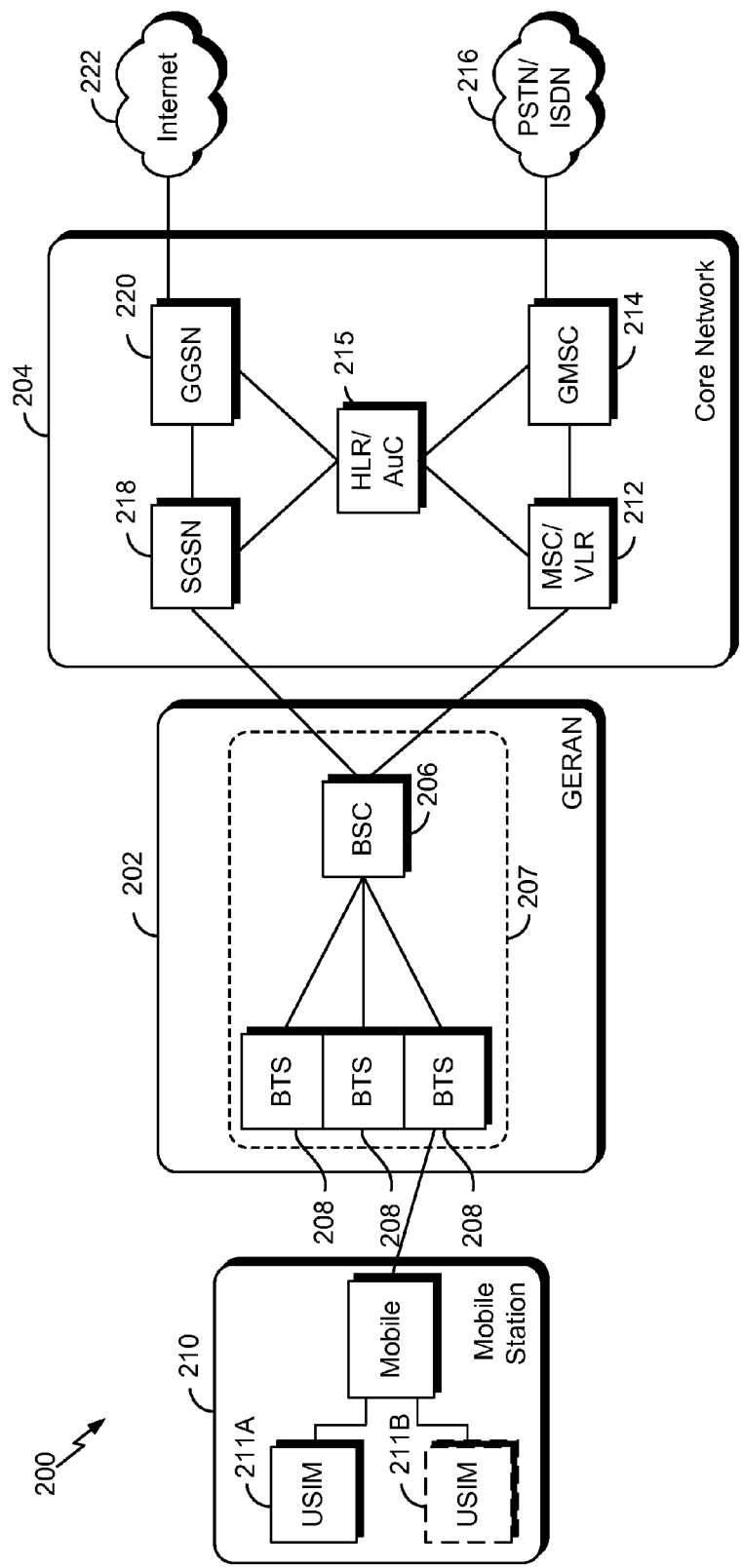
FIG. 2 is a conceptual block diagram illustrating an example of a telecommunications system based on the GSM/GPRS standard according to some embodiments.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a GSM system 200. In one aspect of the disclosure, one or more of the systems 200 may be used to provide services corresponding to the subscriptions 102 and/or 104 of FIG. 1. A GSM system 200 includes three interacting domains: a core network 204 (e.g., a GSM/GPRS core network), a radio access network (RAN) (e.g., a GERAN 202), and a mobile station (MS) 210. In this example, the illustrated GERAN 202 may employ a GSM air interface for enabling various wireless services including telephony, video, data, messaging, broadcasts, and/or other services. The GERAN 202 may include a plurality of Radio Network Subsystems (RNS's) such as an RNS 207, each controlled by a respective Base Station Controller (BSC) such as a BSC 206. Here, the GERAN 202 may include any number of BSCs 206 and RNS's 207 in addition to the illustrated BSCs 206 and RNS's 207. The BSC 206 is an apparatus responsible for, among other things, assigning, reconfiguring, and releasing radio resources within the RNS 207.

The geographic region covered by the RNS 207 may be divided into a number of cells, with a radio transceiver apparatus serving each cell. A radio transceiver apparatus is commonly referred to as a base transceiver station (BTS) in GSM applications, but may also be referred to by those skilled in the art as a base station (BS), a Node B, a radio base station, a radio transceiver, a transceiver function, a basic service set (BSS), an extended service set (ESS), an access point (AP), or some other suitable terminology. For clarity, three BTSs 208 are shown in the illustrated RNS 207; however, the RNS's 207 may include any number of wireless BTSs 208. The BTSs 208 provide wireless access points to a GSM/GPRS core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a tablet computer, a satellite radio, a global positioning system (GPS) device, a multimedia device, a video device, a digital audio player (e.g., MP3 player), a camera, a game console, or any other similar functioning devices. The mobile apparatus is commonly referred to as a mobile station (MS) in GSM applications, but may also be referred to by those skilled in the art as a user equipment (UE), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

The GSM "Um" air interface generally utilizes GMSK modulation (although later enhancements such as enhanced GPRS (EGPRS), may utilize other modulation such as 8PSK), combining frequency hopping transmissions with time division multiple access (TDMA), which divides a frame into 8 time slots. Further, frequency division duplexing (FDD) divides uplink and downlink transmissions using a different carrier frequency for the uplink than that used for the downlink. Those skilled in the art will recognize that although various examples described herein may refer to GSM Um air interface, the underlying principles are equally applicable to any other suitable air interfaces. In some aspects of the disclosure, the GSM system 200 may be further configured for EGPRS. EGPRS is an extension of GSM technology providing increased data rates beyond those available in 2G GSM technology. EGPRS is also known in the field as Enhanced Data rates for GSM Evolution (EDGE), and IMT Single Carrier.

In some aspects of the disclosure, the MS 210 may include a plurality of universal integrated circuit cards (UICC), each of which may run one or more USIM applications 211. The USIM application stores the subscriber's identity, and provides a user's subscription information to a network as well as performing other security and authentication roles. The illustrated MS 210 includes two USIMs 211A and 211B, but those of ordinary skill in the art will understand that this is illustrative in nature only; and a MS may include any suitable number of USIMs or SIMs. Mobile stations such as the MS 210 having multiple USIMs are sometimes referred to as multi-SIM devices, with one particular example with two USIMs being called a DSDA device such as the DSDA 100 of FIG. 1. A DSDS MS 210 is generally capable of being active on two networks/subscriptions concurrently or simultaneously, where the MS 210 may have one or more transceivers that enables the MS 210 to actively communicate with two subscriptions simultaneously. In this way, connections or calls may be established on both networks/subscriptions with a single device.

For illustrative purposes, one MS 210 is shown in communication with one BTS 208 in FIG. 2. The downlink (DL), also called the forward link, refers to the communication link from a BTS 208 to a MS 210, and the uplink (UL), also called the reverse link, refers to the communication link from a MS 210 to a BTS 208.

The core network 204 can interface with one or more access networks, such as the GERAN 202. As shown, the core network 204 is a GSM core network. However, as those skilled in the art will recognize, the various concepts presented throughout this disclosure may be implemented in a RAN, or other suitable access network, to provide mobile stations with access to types of core networks other than the GSM network.

The illustrated GSM core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more BSCs, such as the BSC 206, may be connected to the MSC 212. The MSC 212 is an apparatus that controls call setup, call routing, and mobile station mobility functions. The MSC 212 also includes a visitor location register (VLR) that contains subscriber-related information for the duration that a MS is in the coverage area of the MSC 212. The GMSC 214 provides a gateway through the MSC 212 for the MS to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular MS, the GMSC 214 queries the HLR 215 to determine the MS' location and forwards the call to the particular MSC serving that location.

The illustrated core network 204 also supports packet-switched data services with a serving GPRS support node (SGSN) 218 and a gateway GPRS support node (GGSN) 220. GPRS is designed to provide packet-data services at speeds higher than those available with standard circuit-switched data services. The GGSN 220 provides a connection for the GERAN 202 to a packet-based network 222. The packet-based network 222 may be the Internet, a private data network, intranet, or some other suitable packet-based networks. The primary function of the GGSN 220 is to provide the MS 210 with packet-based network connectivity. Data packets may be transferred between the GGSN 220 and the MS 210 through the SGSN 218, which performs primarily the same functions in the packet-based domain as the MSC 212 performs in the circuit-switched domain. In some aspects of the disclosure, the system 200 may further include a Packet Control Unit (PCU) between the BSC 206 and SGSN/MSC to differentiate whether data is to be routed to the packet switched or circuit switched networks. The PCU itself may be a separate physical entity, or incorporated into the BSC 206, thereby saving additional hardware costs.

In an aspect of the disclosure, the illustrated MS 210 is a DSDA device capable of simultaneously active on two subscriptions, for example, on a GSM subscriptions and a GPRS subscriptions. Within the scope of the present disclosure, similar functionality may be achieved utilizing one or more radio access technology (RAT), wherein the MS 210 simultaneously maintains two or more subscriptions on two or more different RATs. In various aspects of the disclosure, the one or more subscriptions may be associated with a GSM network, a GPRS network, a UMTS network, an LTE network, a cdma2000 network, a Wi-MAX network, or any other suitable RAT. Within the present disclosure, a DSDA device, a multi-SIM device, or any device capable of simultaneously active on two or more subscriptions utilizing any one or any plural number of RATs will be generally referred to as a DSDA device.

In one scenario, for a DSDA MS 210, a transmitter for one subscription and a receiver for another subscription may be in operation at the same time (i.e., transmitting and receiving simultaneously). This condition can be called co-existence or more specifically a TX-RX conflict. In some cases, co-existence can result in unacceptably high interference at the receiver, causing a de-sense, decoding failure, or loss of data at the receiver. In one example, the MS 210 may have a co-existence module for managing co-existence issues that can arise for various RF reasons and band/channel combinations. The MS 210 receives frequency and power information from the supported RATs and checks for any potential de-sense. At the MS 210, the layer 1 (L1) entity of each RAT registers the uplink (UL) and downlink (DL) frequencies that it will be using with the co-existence module. The co-existence module returns a frequency ID for each registered frequency. This information may be used to build the de-sense tables that can be indexed by the frequency ID of each RAT to determine if the bands associated with two time-conflicting activities will cause a de-sense. Each RAT's L1 entity may also provide an expected RX and/or TX power for each frequency ID. This information can be used to include power level thresholding into the de-sense decision. For example, if in an RX-TX conflict the expected RX power level is relatively higher (e.g., substantially higher) than the expected TX power, then it may be decided that there will be no potential for de-sense despite a frequency conflict.

In general, the MS 210 detects a co-existence interference when an aggressing (transmitting) RAT is de-sensing a victim (receiving) RAT. The MS 210 also decides the appropriate priority for these activities. If there is a substantial time overlap between the activities of different RATs (e.g., conflicting RX-TX activities on different RF chains) that can cause de-sense, one of the activities will yield (e.g., blanking) so that the other activity can proceed unaffected.

In one co-existence conflict example, a DSDA MS 210 may be performing a service acquisition procedure for a first subscription, while simultaneously performing a registration procedure for a second subscription. For example, the DSDA MS 210 may be performing service acquisition for a GSM subscription (e.g., subscription 102) and simultaneously performing location registration for a GPRS subscription (e.g., subscription 104). In this co-existence example, the DSDA device 210 may utilize its transmitter for registration and its receiver for service acquisition. Here, the transmitting (TX) side is the aggressor, and the receiving (RX) side is the victim. In the related art, TX-RX conflict or co-existence conflict may be mitigated by stopping TX (e.g., blanking TX) during the receive window of the victim. However, this can lead to delayed registration on the aggressor's subscription, as its TX is yielded on collision with the RX of the victim performing acquisition.

In some scenarios due to networks availability and/or topology, the MS might not acquire service, or might camp on a cell with limited service, so the other subscription (e.g., subscription 104), on which the MS is already camped, should be given higher priority and its registration procedure should not be delayed during co-existence as described above.

In one aspect of the disclosure, the RX of the victim during acquisition is delayed (i.e., turning off or disabling the receiver for a given duration, as known as RX blanking) and yields to the TX of the aggressor that is performing registration. In accordance with another aspect of the disclosure, decode failures on good cells due to RX blanking on the victim subscription during acquisition can be reduced or avoided.

Figure 3:
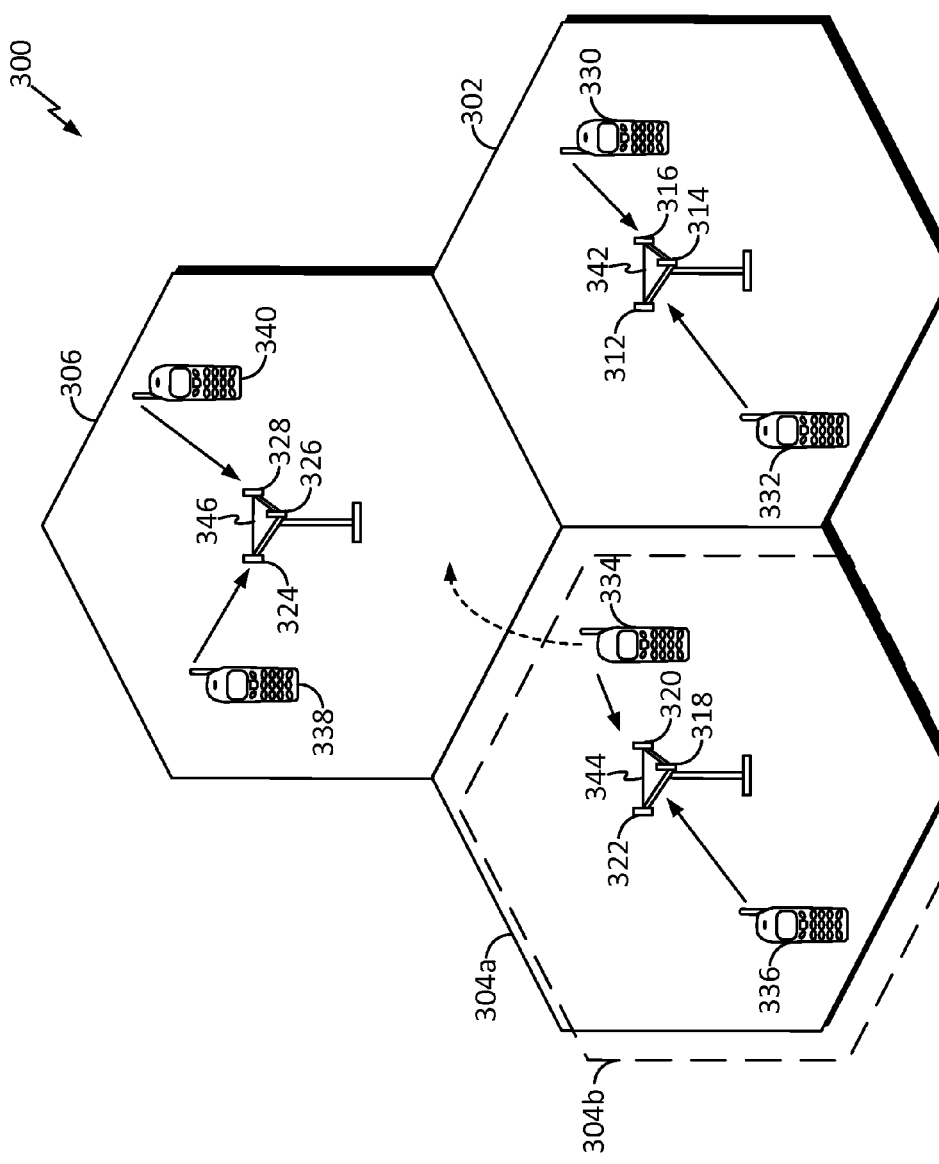
FIG. 3 is a conceptual diagram illustrating an example of an access network according to some embodiments.

The GERAN 202 is one example of a RAN that may be utilized in accordance with the present disclosure. Referring to FIG. 3, by way of example and without limitation, a simplified schematic illustration of a RAN 300 in a GERAN architecture is illustrated. The system includes multiple cellular regions (cells), including cells 302, 304, and 306, each of which may include one or more sectors. Cells may be defined geographically, e.g., by coverage area. In a cell that is divided into sectors, the multiple sectors within a cell can be formed by groups of antennas with each antenna responsible for communication with mobile stations in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several mobile stations that may be in communication with one or more sectors of each cell 302, 304, or 306. For example, MS 330 and MS 332 may be in communication with a BTS 342, MS 334 and MS 336 may be in communication with a BTS 344, and MS 338 and MS 340 may be in communication with a BTS 346. Here, each BTS 342, 344, and 346 may be configured to provide an access point to a core network 204 (see FIG. 2) for all the MS's 330, 332, 334, 336, 338, and 340 in the respective cells 302, 304, and 306.

Each of the cells 302, 304, and 306 may broadcast system information on one or more of radio frequency (RF) carriers (e.g., each identified by an Absolute Radio-Frequency Channel Number (ARFCN) in GSM/GPRS networks) assigned to the cell. For example, a carrier used for broadcasting system information may be the Broadcast Control Channel (BCCH) carrier. Each cell broadcasts a BCCH allocation (BA) list that can include, for example, up to 32 ARFCNs for the BCCH carriers of up to 32 cells. That is the BA list includes one ARFCN/BCCH carrier entry for each cell. The BA lists respectively broadcast by neighbor cells located near each other are typically not identical, but may include many of the same ARFCNs. A MS receives the BA list from its serving cell and performs measurements on the cells included in the BA list, as specified by the GSM standards.

During a call with a source cell, or at any other time, the MS 336 may monitor various parameters of the source cell as well as various parameters of neighboring cells. Further, depending on the quality of these parameters, the MS 336 may maintain communication with one or more of the neighboring cells. For example, the MS 336 may measure the received signal level from the serving cell (e.g., cell 304) and from the BTS's in all adjacent cells (e.g., cells 302 and 306) by tuning and listening to their BCCH carriers. The MS asks for location update whenever it detects from the received BCCH messages that it entered a new location area (LA). In some aspects of the disclosure, the MS 336 may be a DSDA device (e.g., MS 100 and MS 210) that may be simultaneously active on two subscriptions (e.g., GSM subscription and GPRS subscription) respectively associated with one or more RANs similar to the RAN 300.

GPRS Registration

Figure 4:
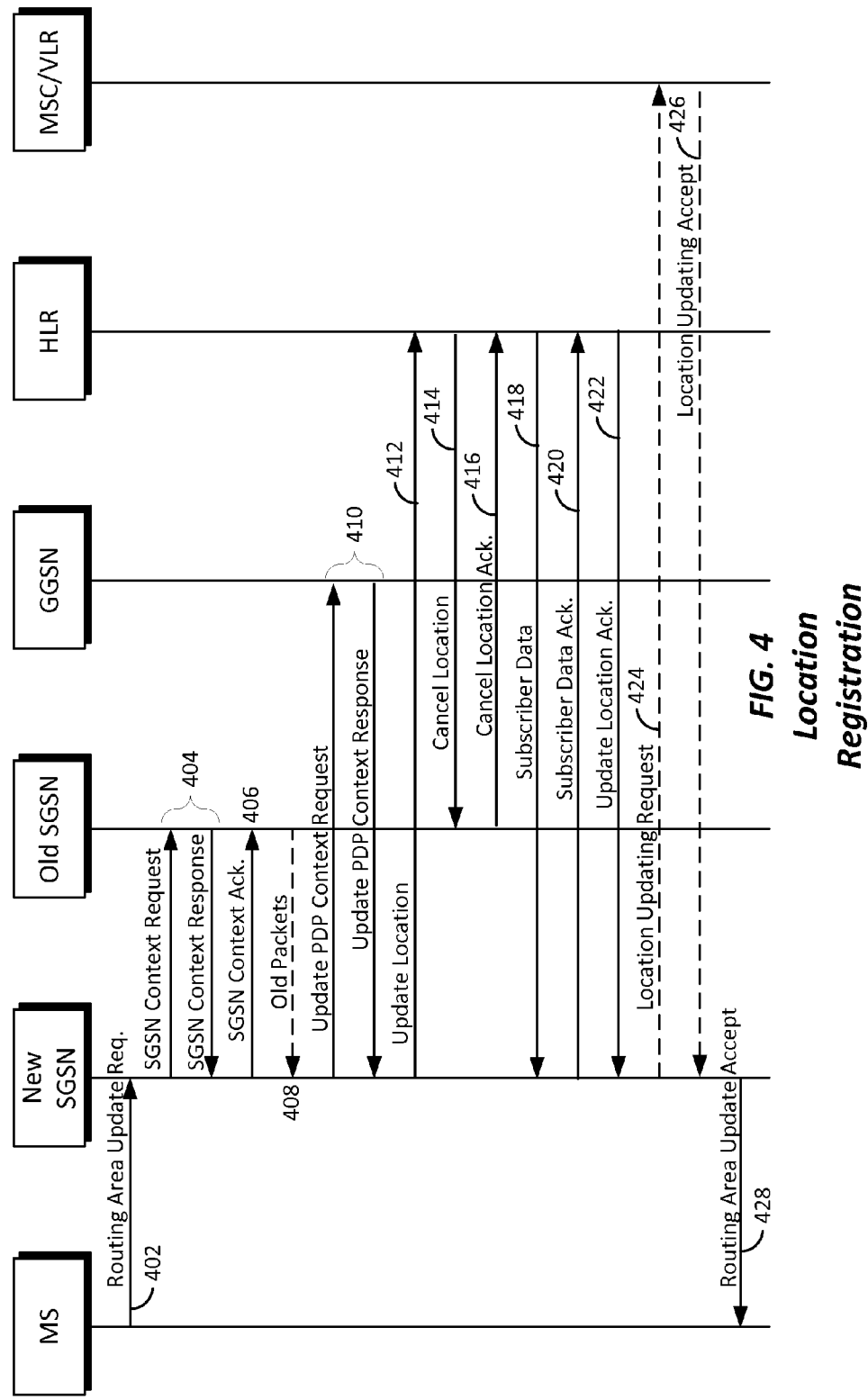
FIG. 4 is a conceptual diagram illustrating a location registration procedure between a mobile station and a GPRS network, according to some embodiments.

A DSDA MS may perform service acquisition on a GSM subscription and simultaneously perform location registration on a GPRS subscription. FIG. 4 is a conceptual diagram illustrating a location registration procedure between a MS and a GPRS network. For example, the MS may be any of the MS's illustrated in FIGS. 1, 2, 3, 7, and/or 8. In a GPRS network, a routing area (RA) is a subset of a GSM location area. GPRS has three types of routing area registration: routing area updating, GPRS attach/detach, and periodic routing area update.

Routing area update is performed when the MS enters a new RA. GPRS Attach/Detach registration is performed to indicate mobile activation/deactivation within a RA, prevents paging of a MS that is not active (e.g., visited VLR rejects calls from the HLR or applies Call Forwarding).

Periodic routing area update is performed to ensure that regular radio contact is maintained by the MS. The periodicity may be determined by the network. In one example, the MS may perform some or any of the above registration processes on the GPRS subscription 104 while simultaneously performing service acquisition on the GSM subscription 102.

Referring to FIG. 4, in a location registration procedure, the MS sends a Routing Area Update Request 402 to a new SGSN. The new SGSN then exchanges an SGSN Context Request/Response 404 with the old SGSN. Upon receipt of the SGSN Context Response 404 and after optional security has been performed, the new SGSN sends an SGSN Context Acknowledge 406 to the old SGSN if the MS has at least one packet data protocol (PDP) context active. Upon receipt of the SGSN Context Acknowledge 406, the old SGSN may forward any packets 408 from the old SGSN to the new SGSN. After sending the SGSN Context Acknowledge 406, the new SGSN initiates the Update PDP Context 410 with the GGSN. Upon completion of the Update PDP Context, the new SGSN sends the Update Location 412 to the HLR. This results in a Cancel Location 414 sent to the old SGSN and a Cancel Location Acknowledge 416 sent to the HLR. The Subscriber Data 418 is then sent to the new SGSN. Upon receipt of the Subscriber Data Acknowledgement 420, the HLR sends an Update Location Acknowledge 422 to the new SGSN. Then the new SGSN may send a Location Updating Request 424 to the MSC/VLR, which may send a Location Updating Acknowledge 426 back to the new SGSN. This location updating procedure may be combined with GSM Location Update. Upon completion of the location update, the new SGSN sends a Routing Area Update Accept 428 to the MS.

GSM Service Acquisition

Referring back to FIG. 1, when the DSDA MS 100 is powered on, it performs cell selection and searches for a suitable serving cell from which it may receive communication service. When a suitable cell is found, the MS 100 camps on this cell, which becomes the serving cell. For example, the MS 100 may be searching for a serving cell on the GSM subscription 102 while simultaneously performing a GPRS registration procedure (e.g., the location registration of FIG. 4) on the GPRS subscription 104.

Figure 5:
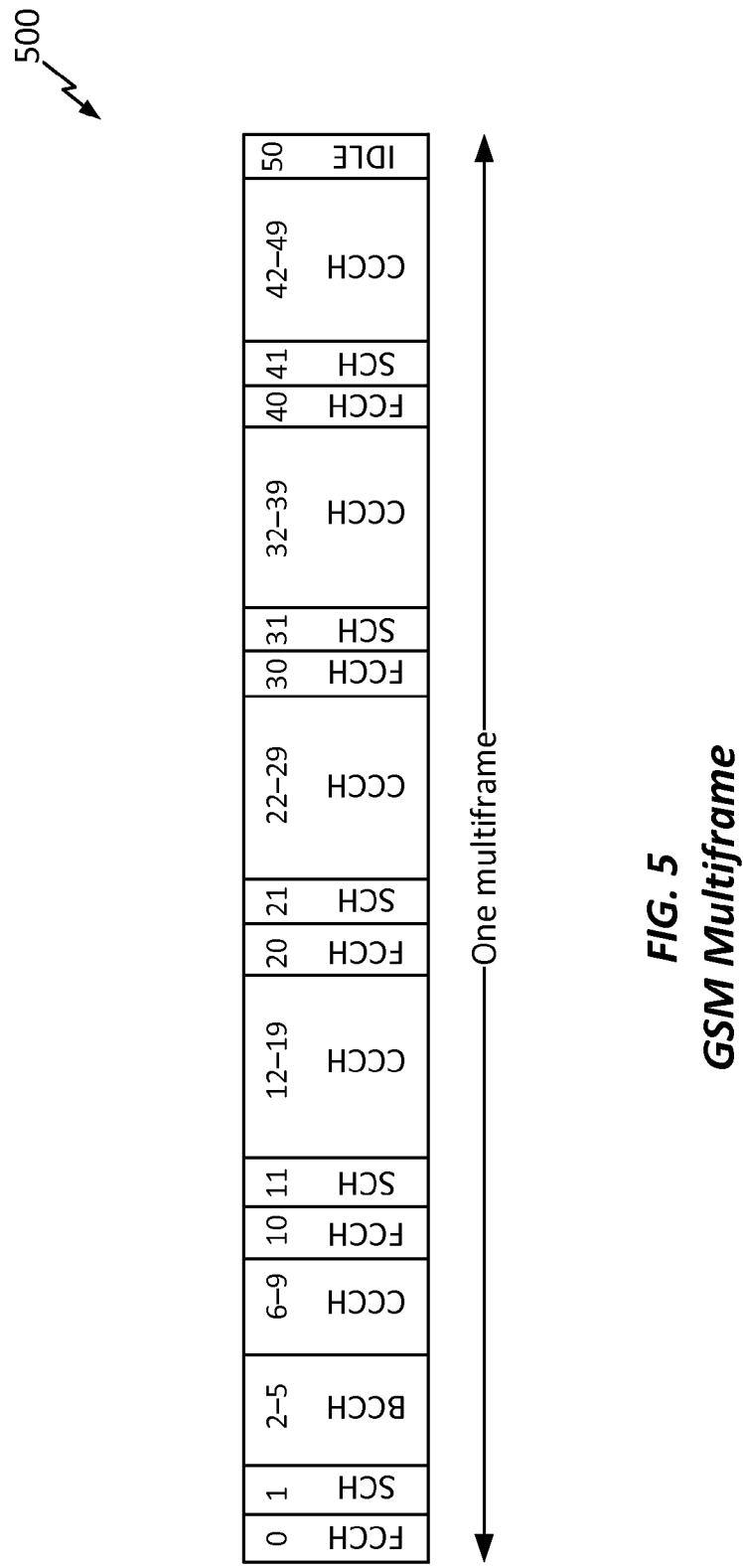
FIG. 5 is a conceptual diagram illustrating a control channel configuration for a GSM multiframe according to some embodiments.

FIG. 5 is a conceptual diagram illustrating a control channel configuration for a GSM multiframe 500 according to one example. Each GSM multiframe 500 is partitioned into 51 TDMA frames, which are labeled as frames 0 through 50 in FIG. 5. Each frame is further partitioned into 8 time slots (not shown), which are time slots 0 through 7. In general, control channels may utilize time slot 0, and traffic channels may utilize time slots 1 through 7. The data transmission in each time slot is referred to as a "burst."

The GSM control channels include, for example, a Frequency Correction Channel (FCCH), a Synchronization Channel (SCH), a Broadcast Control Channel (BCCH), and a Common Control Channel (CCCH). The FCCH may be sent in frames 0, 10, 20, 30 and 40 of each multiframe, and is used for setting MS frequency and timing. The SCH may be sent in frames 1, 11, 21, 31 and 41 of each multiframe, and is used for synchronizing MS timing and frame numbering with a base station or network. The BCCH may be sent in frames 2, 3, 4 and 5 of each multiframe and carries system information. The CCCH carries control information such as a paging channel (PCH). The PCH carries paging messages that alert a MS on incoming calls. The multiframe 500 shows one configuration for the control channels. However, the present disclosure is not limited to the particular multiframe 500 configuration of FIG. 5, and other combinations of control channels may be used. For example, other valid channel configurations for the control channels in GSM are described in the 3GPP standards.

After a MS has just been powered on (idle mode), or after it has lost contact with the network, it searches the supported RF channels and takes readings of the signal level on each of them. The RF channels (e.g., GSM frequencies or carriers) may be specified by ARFCNs. Then the MS tunes to the ARFCN with the highest signal level and searches for the corresponding FCCH and SCH in order to determine whether or not the carrier is a valid BCCH carrier. This process may be referred to as service acquisition. If the current ARFCN is not a valid BCCH, then the MS tunes to the next highest carrier, and so on, until it finds a valid BCCH, synchronizes to it and decodes the various parameters in order to decide whether or not to continue the search or to camp on the current cell.

Figure 6:
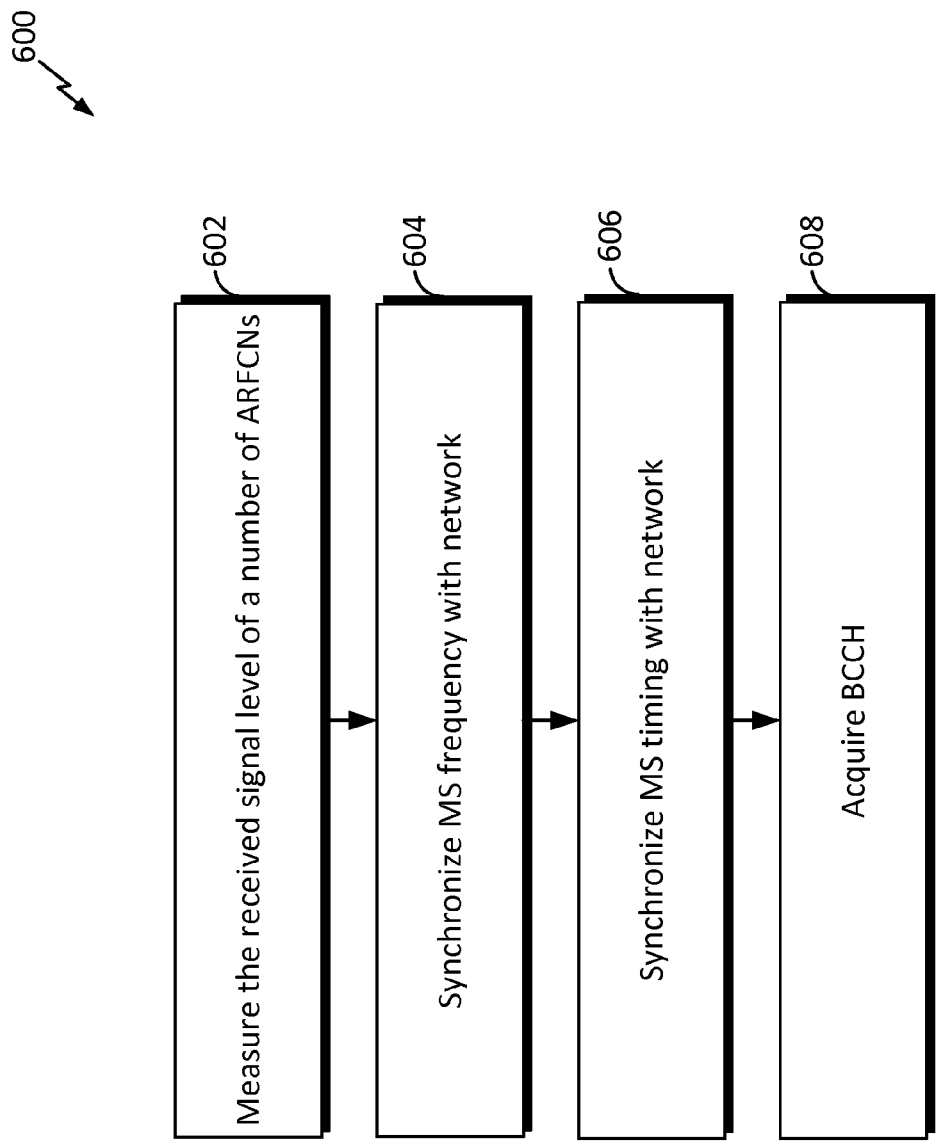
FIG. 6 is a diagram illustrating a number of tasks that may be performed by a mobile station during a service acquisition procedure, according to some embodiments.

FIG. 6 is a diagram illustrating a number of tasks that may be performed by a MS during a service acquisition procedure 600. In one example, some or all of the tasks of the procedure 600 may be performed by any of the MS's illustrated in FIGS. 1, 2, 3, 7, and 8. In one aspect of the disclosure, the MS 100 may perform one or more of the tasks of the procedure 600 to acquire service on a GSM subscription. At block 602, the MS may measure the received signal level of one or more ARFCNs supported by the MS. At block 604, the MS synchronizes its own frequency to that of the base station (or network) by receiving and decoding Frequency Correction Bursts (FCBs) from the FCCH of the strongest ARFCN (e.g., BCCH carrier). At block 606, the MS synchronizes its timing to the TDMA frame structure and timeslots of the network by receiving and decoding the SCH associated with the same ARFCN. At block 608, the MS attempts to decode the BCCH to acquire service. The MS may perform the tasks of FIG. 6 in different orders in sequence and/or simultaneously. The tasks illustrated in FIG. 6 are not exhaustive, and other tasks that may be performed by the MS during service acquisition, for example, such as those described in the relevant 3GPP standards.

Figure 7:
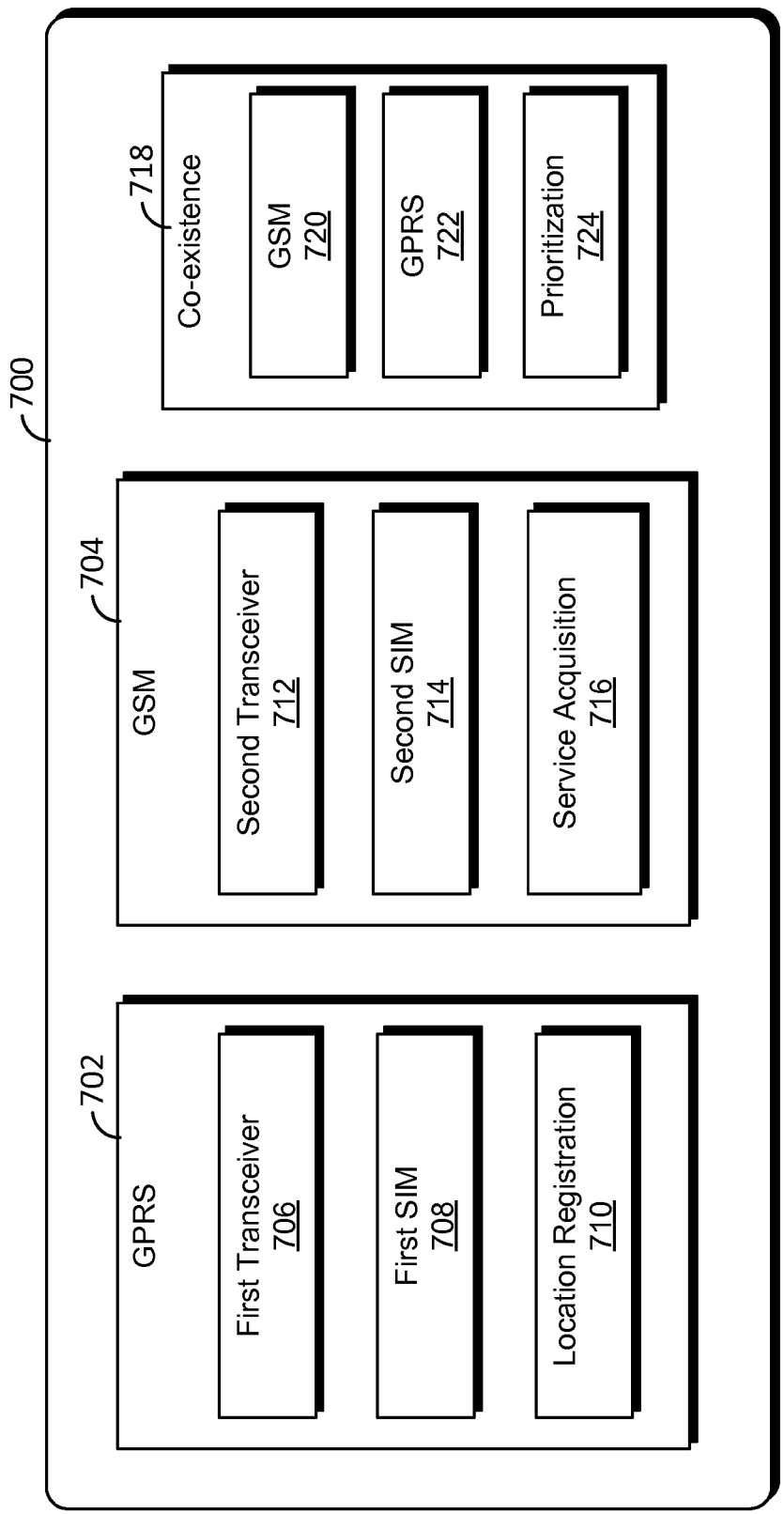
FIG. 7 is a conceptual block diagram illustrating a mobile station configured to handle co-existence between a GPRS subscription and a GSM subscription in accordance with some embodiments.

FIG. 7 is a conceptual block diagram illustrating a MS 700 configured to handle co-existence between a GPRS subscription and a GSM subscription in accordance with an aspect of the present disclosure. The MS 700 may be any of the MS's illustrated in FIGS. 1, 2, 3, and/or 8. In various aspects of the disclosure, the MS 700 may perform the various procedures, processes, and/or steps illustrated in FIGS. 4, 6, and 9-11. The MS 700 includes a GPRS block 702 and a GSM block 704. The GPRS block 702 may be used to communicate on a GPRS subscription, and the GSM block 704 may be used to communicate on a GSM subscription. In one example, the GPRS block 702 may include a first transceiver 706, a first SIM 708, and a location registration component 710. The first transceiver 706 may be used to transmit and/or receive data on the GPRS subscription. The first SIM 708 stores information and/or parameters for the GPRS subscription. The location registration component 710 may be used to perform registration procedures. In one example, the location registration component 710 may be used to perform the location registration procedure illustrated in FIG. 4.

In one example, the GSM block 704 includes a second transceiver 712, a second SIM 714, and a service acquisition component 716. The second transceiver 712 may be used to transmit and/or receive data on a GSM subscription. The second SIM 714 stores information and/or parameters for the GSM subscription. The service acquisition component 716 may be used to perform service acquisition procedures. In one example, the service acquisition component 716 may be used to perform the service acquisition procedure 600 illustrated in FIG. 6. In one example, the GPRS subscription may be the GPRS subscription 104, and the GSM subscription may be the GSM subscription 102 of FIG. 1.

The MS 700 further includes a co-existence block 718 configured to handle co-existence scenarios between the GPRS and GSM subscriptions. In one example, the co-existence scenario may be a conflict when the MS 700 is performing location registration on the GPRS subscription and simultaneously performing service acquisition on the GSM subscription. In addition, the co-existence block 718 may include modules and/or software for configuring and controlling the various components of the MS 700 to perform the various co-existence procedures described below. For example, the co-existence block 718 may include a GSM module 720 for configuring and/or controlling the GSM block 704, a GPRS module 722 for configuring and/or controlling the GPRS block 702, and a prioritization module 724 for managing and/or prioritizing the GSM and GPRS subscriptions. More detail of the operations of the co-existence block 718 will be provided below in relation to FIGS. 9-11. The various components, blocks, and modules of the MS 700 may be implemented in software, hardware, firmware, and any combinations thereof.

Figure 8:
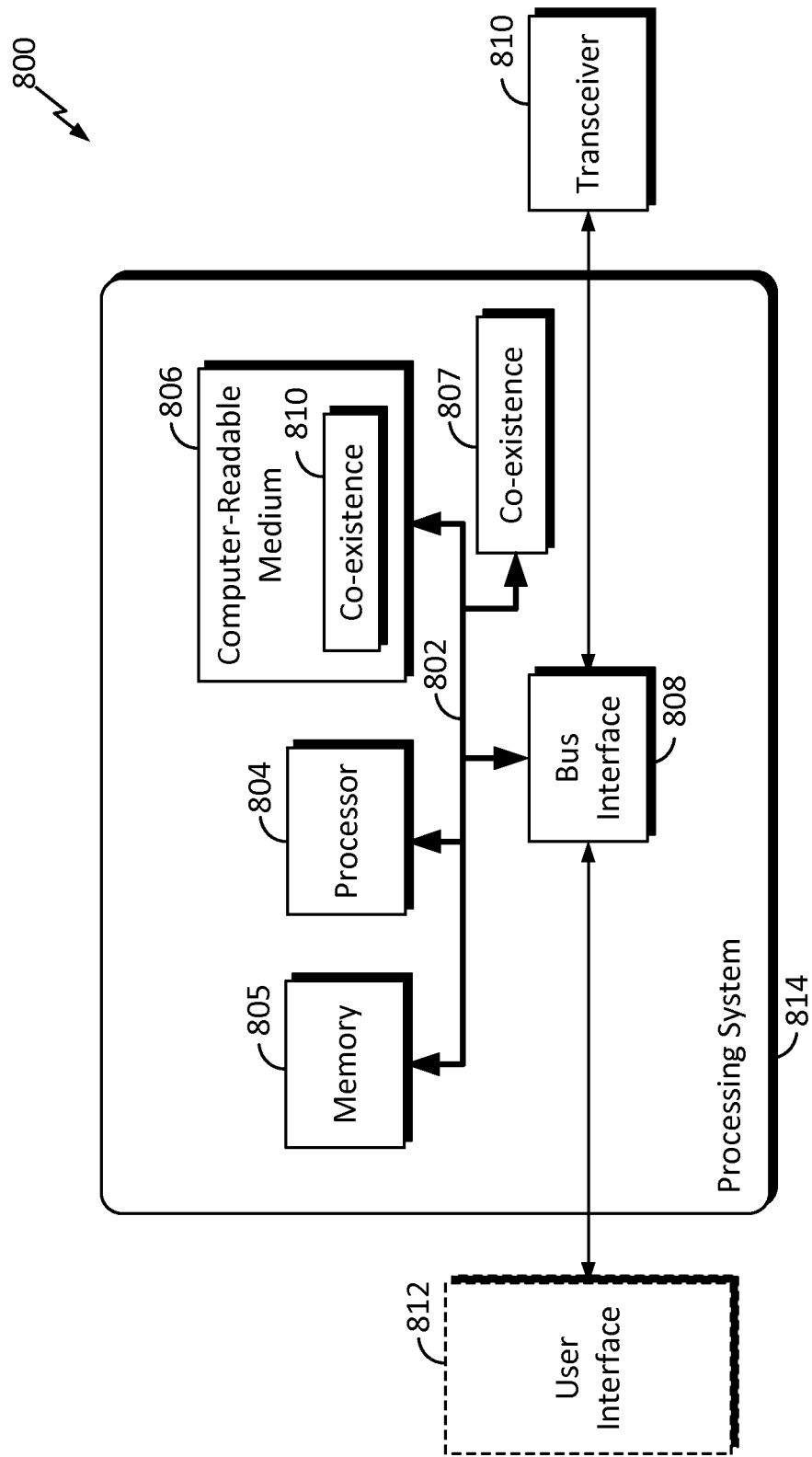
FIG. 8 is a conceptual diagram illustrating an example of a hardware implementation for an apparatus employing a processing system in accordance with some embodiments.

FIG. 8 is a conceptual diagram illustrating an example of a hardware implementation for an apparatus 800 employing a processing system 814. In accordance with various aspects of the disclosure, an element, or any portion of an element, or any combination of elements may be implemented with a processing system 814 that includes one or more processors 804. For example, the apparatus 800 may be a MS as illustrated in any one or more of FIGS. 1, 2, 3, and/or 7. In one example, the MS 700 of FIG. 7 may be implemented using the apparatus 800. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 804, as utilized in an apparatus 800, may be used to implement any one or more of the processes described and illustrated in FIGS. 4, 6, and 9-11.

In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), a memory 805, and computer-readable media (represented generally by the computer-readable medium 806). The processing system 814 may also include a co-existence block 807 that is operatively coupled with the other circuits of the processing system 814. In one example, the co-existence block 807 may include some or all the various components illustrated in the UE 700 of FIG. 7. The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium. The transceiver 810 may include one or more transmitters and receivers for accessing one or more subscriptions. Depending upon the nature of the apparatus, a user interface 812 (e.g., keypad, display, speaker, microphone, joystick, touchpad, trackpad, touchscreen) may also be provided.

The processor 804 is responsible for managing the bus 802 and general processing, including the execution of software stored on the computer-readable medium 806. The software, when executed by the processor 804, causes the processing system 814 to perform the various functions described in this disclosure for any particular apparatus. The software may include a co-existence component 810 that may configure the processor 804 and/or the co-existence block 807 to perform the various functions described in FIGS. 9-11. The computer-readable medium 806 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

According to aspects of the present disclosure, if a co-existence condition has been detected when a MS is performing location registration on a subscription (e.g., a GPRS subscription) while performing service acquisition the another subscription (e.g., a GSM subscription), then the subscription performing registration should be given higher priority, and its TX should not be blanked. In some aspects of the disclosure, the priority of the subscription that is performing location registration should be elevated when its TX is colliding with, for example, the FCCH, SCH, and/or BCCH RX of the other subscription. This may avoid or reduce frequent interruptions and reestablishment of a temporary block flow (TBF) between the MS and the base station while undertaking location registration. However, when the TX on one subscription is given higher priority, the RX of the other subscription would be blanked (i.e., RX being turned off or disabled during certain intervals) leading to acquisition failures on the corresponding frequencies or ARFCNs. In one aspect of the disclosure, to avoid acquisition failure (e.g., decode failure) and full power scan getting triggered when RX is blanked, acquisition may be reattempted on those ARFCNs for which collision was detected.

Figure 9:
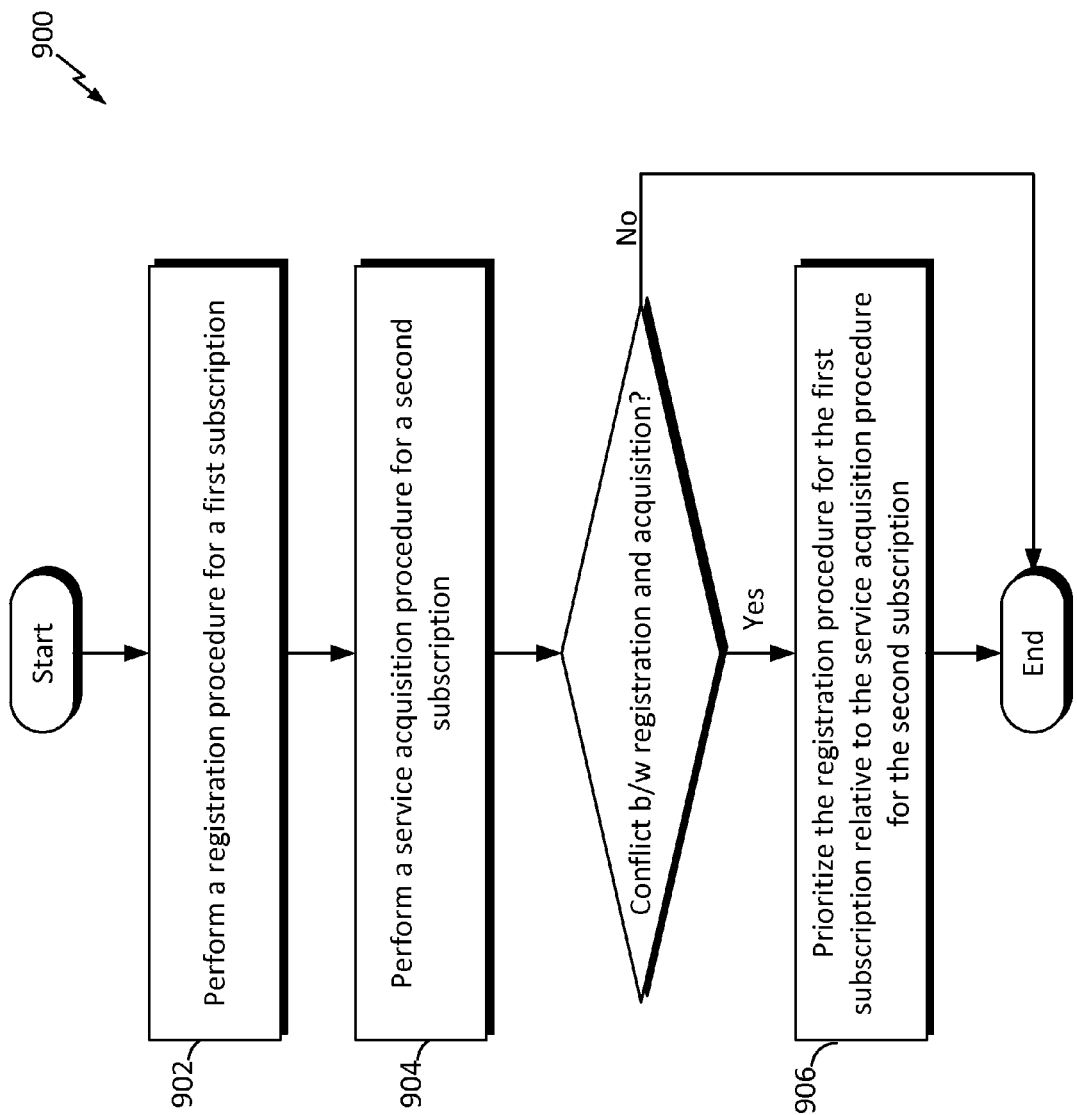
FIG. 9 is a flowchart illustrating a method of mitigating a co-existence conflict in accordance with some embodiments.

FIG. 9 is a flowchart illustrating a method 900 of mitigating a co-existence conflict in accordance with an aspect of the disclosure. The method 900 may be performed by any of the MS's illustrated in FIGS. 1, 2, 3, 7, and/or 8. In one aspect of the disclosure, the MS may be the MS 100, 700, or 800. The method 900 can mitigate a co-existence conflict when a MS is simultaneously active on a first subscription and a second subscription. In one specific example, the MS can be simultaneously performing location registration on a GPRS subscription and service acquisition on a GSM subscription (e.g., subscriptions 102 and 104 of FIG. 1).

At block 902, the MS performs a registration procedure for a first subscription. The registration procedure may be a location registration procedure described above and illustrated in FIG. 4 for a GPRS subscription 102. In one example, the MS may utilize the GPRS block 702 of FIG. 7 to perform the location registration procedure. At block 904, the MS performs a service acquisition procedure for a second subscription. The registration procedure and the acquisition procedure may be simultaneously performed (e.g., see FIG. 10). That is, the registration procedure and the acquisition procedure may be at least partially overlapped in time. In one example, the service acquisition procedure may be the service acquisition procedure 600 as described in FIG. 6 for a GSM subscription 104. In one example, the MS may utilize the GSM block 704 of FIG. 7 to perform the service acquisition procedure. Here, the MS may experience a co-existence conflict (e.g., TX-RX conflict) because the MS is simultaneously active (i.e., performing the registration procedure and acquisition procedure) on both subscriptions.

Figure 10:
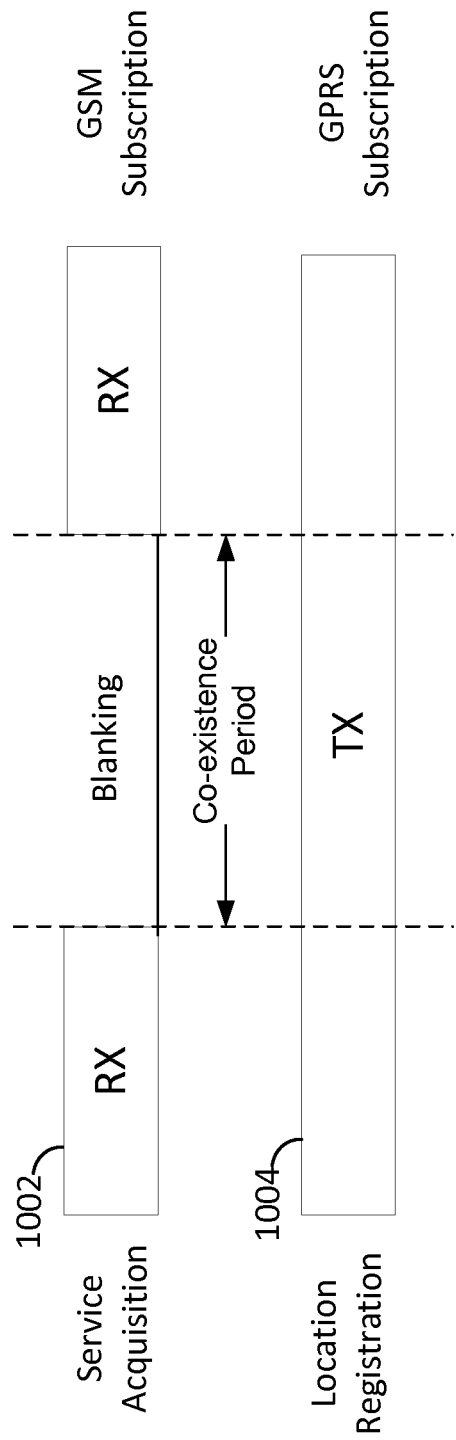
FIG. 10 is a conceptual diagram illustrating a co-existence conflict between service acquisition and location registration according to some embodiments.

If a co-existence conflict between the registration procedure and the service acquisition procedure is detected, the method 900 proceeds to block 906; otherwise, the method may end. At block 906, the MS may prioritize the registration procedure relative to the service acquisition procedure. In one example, the MS may utilize the co-existence block 718 of FIG. 7 to prioritize the location registration procedure. In one example, prioritizing the location registration procedure may include blanking a receiver of the MS utilized for the service acquisition procedure. FIG. 10 is a conceptual diagram illustrating a co-existence conflict between service acquisition and location registration according to one example. During a co-existence period, according to the method 900, the service acquisition RX 1002 on a GSM subscription is blanked (i.e., turning off or disabling a receiver of the MS) while TX of the registration on a GPRS subscription is ongoing. In this example, the MS may utilize the GSM block 704 of FIG. 7 to control the blanking of the receiver (e.g., transceiver 712). In this case, the location registration 1004 is given higher priority than the service acquisition 1002. In other words, a transmitter for the location registration 1004 is not blanked during the co-existence period.

Figure 11:
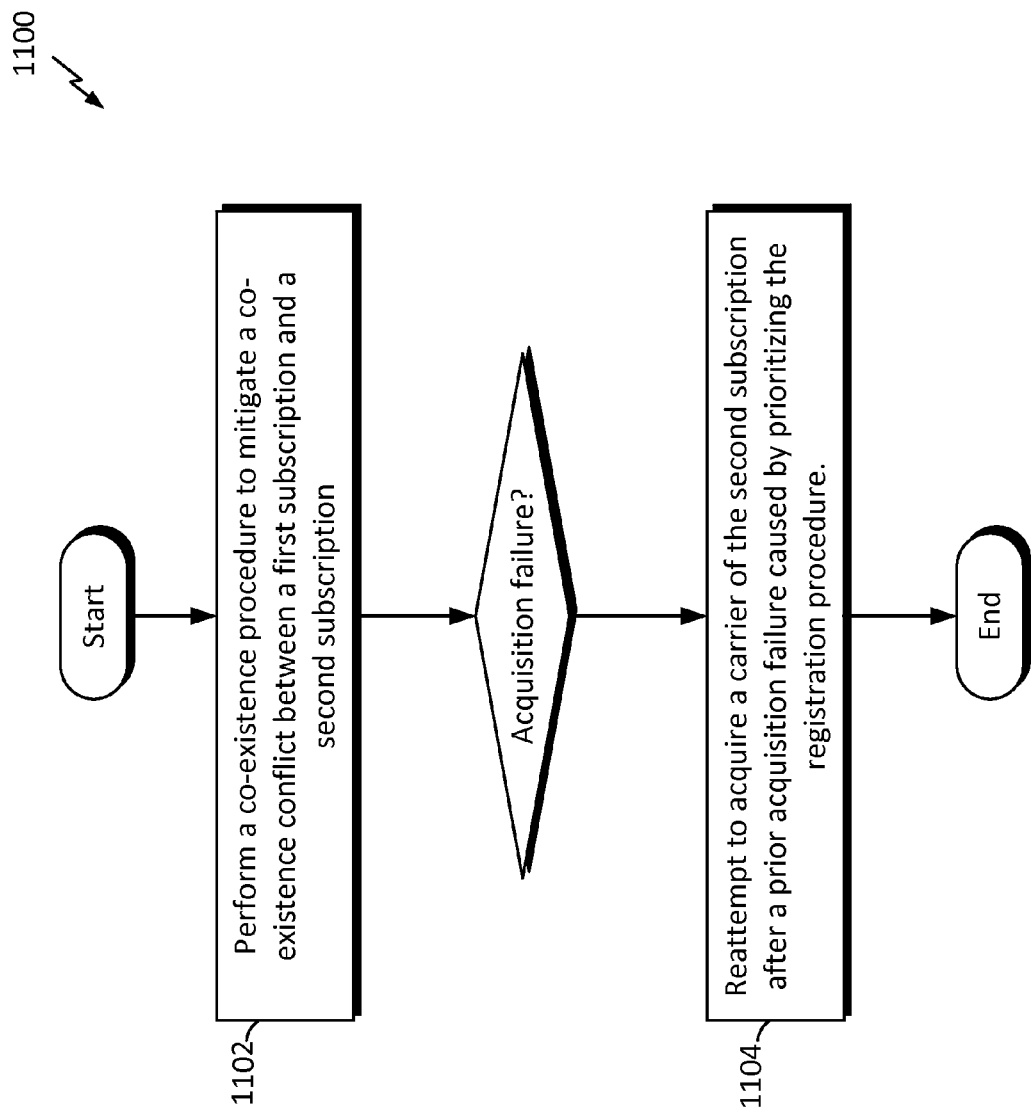
FIG. 11 is a flowchart illustrating a method of reducing service acquisition failure in accordance with some embodiments.

FIG. 11 is a flowchart illustrating a method 1100 of reducing service acquisition failure in accordance with an aspect of the disclosure. For example, the method 1100 may be performed by any of the MS's illustrated in FIGS. 1, 2, 3, 7, and/or 8. In one aspect of the disclosure, the method 1100 may be performed by the MS 700. At block 1102, the MS performs a co-existence procedure to mitigate a co-existence conflict between a first subscription (e.g., GPRS subscription 104) and a second subscription (e.g., GSM subscription 102). In one example, the MS may perform the co-existence procedure of FIG. 9 to prioritize a registration procedure for the first subscription over the second subscription. If acquisition failure occurs while performing the co-existence procedure, the method proceeds to block 1104; otherwise, the method 1100 may end. Acquisition failure may occur when the MS fails to acquire and/or decode one or more channels (e.g., FCH, SCH, and BCCH) of one or more ARFCNs (carriers) during service acquisition. At block 1104, the MS reattempts to acquire a carrier of the second subscription after a prior acquisition failure caused by prioritizing the registration procedure.

Several aspects of a telecommunications system have been presented with reference to a GSM/GPRS system. As those skilled in the art will readily appreciate, various aspects described throughout this disclosure may be extended to other telecommunication systems, network architectures and communication standards.

By way of example, various aspects may be extended to UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein.

The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a mobile station (MS) comprising a first transceiver configured to transmit data on a first subscription and a second transceiver configured to receive data on a second subscription, comprising:
   performing, utilizing the first transceiver, a registration procedure for the first subscription;
   performing, utilizing the second transceiver, a service acquisition procedure for the second subscription; and
   if a co-existence conflict between the registration procedure and the service acquisition procedure occurs, prioritizing the registration procedure relative to the service acquisition procedure by blanking the second transceiver utilized for the service acquisition procedure.

2. The method of claim 1, wherein prioritizing the registration procedure comprises not blanking the first transceiver of the MS utilized for the registration procedure.

3. The method of claim 1, wherein the first subscription comprises a General Packet Radio Service (GPRS) subscription, and the second subscription comprises a Global System for Mobile Communications (GSM) subscription.

4. The method of claim 1, further comprising: reattempting to acquire a carrier of the second subscription after a prior acquisition failure due to prioritizing the registration procedure.

5. The method of claim 1, wherein the co-existence conflict occurs when a transmission to the first subscription collides with a transmission on at least one of a Frequency Correction Channel (FCCH), a Synchronization Channel (SCH), or a Broadcast Control Channel (BCCH) of the second subscription.

6. The method of claim 1, further comprising mitigating acquisition failure on the second subscription while prioritizing the registration procedure.

7. An apparatus for wireless communication, comprising:
   a first transceiver configured to transmit data on a first subscription;
   a second transceiver configured to receive data on a second subscription;
   means for performing, utilizing the first transceiver, a registration procedure for the first subscription;
   means for performing, utilizing the second transceiver, a service acquisition procedure for the second subscription; and
   means for if a co-existence conflict between the registration procedure and the service acquisition procedure occurs, prioritizing the registration procedure relative to the service acquisition procedure by blanking the second transceiver utilized for the service acquisition procedure.

8. The apparatus of claim 7, wherein the means for prioritizing the registration procedure is configured not to blank the first transceiver of the MS utilized for the registration procedure.

9. The apparatus of claim 7, wherein the first subscription comprises a General Packet Radio Service (GPRS) subscription, and the second subscription comprises a Global System for Mobile Communications (GSM) subscription.

10. The apparatus of claim 7, further comprising: means for reattempting to acquire a carrier of the second subscription after a prior acquisition failure due to prioritizing the registration procedure.

11. The apparatus of claim 7, wherein the co-existence conflict occurs when a transmission to the first subscription collides with a transmission on at least one of a Frequency Correction Channel (FCCH), a Synchronization Channel (SCH), or a Broadcast Control Channel (BCCH) of the second subscription.

12. The apparatus of claim 7, further comprising means for mitigating acquisition failure on the second subscription while prioritizing the registration procedure.

13. A non-transitory computer-readable storage medium comprising code for causing a mobile station (MS) comprising a first transceiver configured to transmit data on a first subscription and a second transceiver configured to receive data on a second subscription, to:
   perform, utilizing the first transceiver, a registration procedure for the first subscription;
   perform, utilizing the second transceiver, a service acquisition procedure for the second subscription; and
   if a co-existence conflict between the registration procedure and the service acquisition procedure occurs, prioritize the registration procedure relative to the service acquisition procedure by blanking the second transceiver utilized for the service acquisition procedure.

14. The non-transitory computer-readable storage medium of claim 13, wherein for prioritizing the registration procedure, the code further causes the MS not to blank the first transceiver of the MS utilized for the registration procedure.

15. The non-transitory computer-readable storage medium of claim 13, wherein the first subscription comprises a General Packet Radio Service (GPRS) subscription, and the second subscription comprises a Global System for Mobile Communications (GSM) subscription.

16. The non-transitory computer-readable storage medium of claim 13, wherein the code further cause the MS to reattempt to acquire a carrier of the second subscription after a prior acquisition failure due to prioritizing the registration procedure.

17. The non-transitory computer-readable storage medium of claim 13, wherein the co-existence conflict occurs when a transmission to the first subscription collides with a transmission on at least one of a Frequency Correction Channel (FCCH), a Synchronization Channel (SCH), or a Broadcast Control Channel (BCCH) of the second subscription.

18. The non-transitory computer-readable storage medium of claim 13, wherein the code further causes the MS to mitigate acquisition failure on the second subscription while prioritizing the registration procedure.

19. An apparatus for wireless communication, comprising:
   at least one processor;
   a first transceiver configured to transmit data on a first subscription and a second transceiver configured to receive data on a second subscription, coupled to the at least one processor;
   a memory coupled to the at least one processor;
   a registration component configured to perform, utilizing the first transceiver, a registration procedure for the first subscription;
   an acquisition component configured to perform a service acquisition procedure, utilizing the second transceiver, for the second subscription; and
   a co-existence component configured to if a co-existence conflict between the registration procedure and the service acquisition procedure occurs, prioritize the registration procedure relative to the service acquisition procedure by blanking the second transceiver utilized for the service acquisition procedure.

20. The apparatus of claim 19, wherein the co-existence component is further configured not to blank the first transceiver of the MS utilized for the registration procedure.

21. The apparatus of claim 19, wherein the first subscription comprises a General Packet Radio Service (GPRS) subscription, and the second subscription comprises a Global System for Mobile Communications (GSM) subscription.

22. The apparatus of claim 19, wherein the acquisition component is further configured to reattempt to acquire a carrier of the second subscription after a prior acquisition failure due to prioritizing the registration procedure.

23. The apparatus of claim 19, wherein the co-existence conflict occurs when a transmission to the first subscription collides with a transmission on at least one of a Frequency Correction Channel (FCCH), a Synchronization Channel (SCH), or a Broadcast Control Channel (BCCH) of the second subscription.

24. The apparatus of claim 19, wherein the acquisition component is further configured to mitigate acquisition failure on the second subscription while prioritizing the registration procedure.

* * * * *